(12) United States Patent
Caspers et al.

(10) Patent No.: US 8,214,532 B2
(45) Date of Patent: Jul. 3, 2012

(54) COMMUNICATION PROTOCOL BRIDGE AND CONTROLLER METHOD AND SYSTEM

(75) Inventors: John P. Caspers, Racine, WI (US);
Jeffrey Scott Martin, Sr., Mukwonago, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1286 days.

(21) Appl. No.: 10/832,689

(22) Filed: Apr. 27, 2004

(65) Prior Publication Data
US 2005/0240675 A1    Oct. 27, 2005

(51) Int. Cl.
*G06F 15/16*    (2006.01)
(52) U.S. Cl. ............... 709/249; 709/223; 370/401
(58) Field of Classification Search ............ 709/249, 709/223; 370/401
See application file for complete search history.

(56) References Cited

U.S. PATENT DOCUMENTS

| | | | | |
|---|---|---|---|---|
| 4,078,193 A | * | 3/1978 | Anderson et al. | 388/815 |
| 5,400,331 A | * | 3/1995 | Lucak et al. | 370/401 |
| 6,321,272 B1 | | 11/2001 | Swales | |
| 6,434,157 B1 | | 8/2002 | Dube' et al. | |
| 6,640,140 B1 | | 10/2003 | Lindner et al. | |
| 7,330,473 B1 | * | 2/2008 | Baier et al. | 700/1 |
| 2002/0194363 A1 | * | 12/2002 | Jha | 709/249 |
| 2004/0054829 A1 | | 3/2004 | White, III et al. | |
| 2004/0153594 A1 | * | 8/2004 | Rotvold et al. | 710/305 |
| 2004/0210664 A1 | * | 10/2004 | Prendergast | 709/230 |
| 2005/0228509 A1 | * | 10/2005 | James | 700/19 |

* cited by examiner

*Primary Examiner* — Patrice Winder
(74) *Attorney, Agent, or Firm* — Fletcher Yoder, P.C.; Alexander R. Kuszewski; John M. Miller

(57) ABSTRACT

A technique is provided for communicating between networks and devices operating in accordance with different network protocols, and for performing logical operations on some or all of the data received and transmitted in accordance with either protocol. Where logic is enabled in a bridge/PLC, and where data is bound or affected by the logic, logical operations may be performed and data stored in a memory module or transmitted to one or another of the networks or devices in accordance with either protocol. Where data is not bound or logic is not enabled, the device may serve as a simple protocol bridge receiving input in one or both protocols, and producing output in accordance with either protocol.

32 Claims, 4 Drawing Sheets

US 8,214,532 B2

COMMUNICATION PROTOCOL BRIDGE AND CONTROLLER METHOD AND SYSTEM

BACKGROUND

The present invention relates generally to the field of network interface devices, and more particularly to a communication bridge for interconnecting networks operating on different protocols, and able to perform logical functions on the data where desired.

Many different types of networks and network protocols have been developed and are presently in use. In industrial settings, for example, protocols are used to define the format for messages exchanged between devices, and to regulate traffic flow of the data. The protocol may define such parameters as the bits available for message data, the meaning of message data within the bits, as well as bits used for headers, trailing bits, and so forth. Specialized circuitry in each of the devices serves to encode and decode the data in accordance with the established protocol. In industrial and other environments, such protocols include control area network (CAN) protocols, device network (DeviceNet or DNet) protocols, Ethernet protocols, Internet protocols, and other specialized protocols, such as Profibus, Modbus, and so forth.

Depending upon the design of the particular device or component to be interfaced with a network, appropriate circuitry and programming may not always be present for communicating in accordance with the network protocol. In many instances, networks are divided into regions or segments, with different protocols being used within the different segments. For example, within a machine components may be designed to operate over one protocol, while the network to which the machine is connected operates in accordance with a different protocol. To accommodate such differences in hardware and programming, protocol or communication bridges have been developed that can store and translate data between the protocols. Such bridges are extremely useful in adapting standard components and machines to a variety of network protocols, allowing interfacing of many different components and machines or many different networks as desired.

While protocols bridges provide useful interfacing, heretofore known bridges of this type have not performed logical functions. That is, the bridges serve to facilitate the exchange of data between protocols, but are not equipped with logic circuitry that permits enhanced operation.

There is a need for improved bridging circuits that can enable certain logical operations. Such needs, however, have not been filled in the art or even recognized as such. Moreover, current designs for logic circuitry typically include logical programming circuitry in specialized control or monitoring systems, in specific components, and elsewhere. Communication bridging circuitry is considered completely separate and only added where necessary to existing logical circuits, always in separate devices with limited functionality.

BRIEF DESCRIPTION

The present invention provides a communication bridge designed to respond to such needs. The circuitry may be designed to operate between any suitable protocols, and may be designed to share memory such that data formatted in either protocol can be passed along between networks and devices in accordance with both protocols. Where desired, however, certain logical operators can be present and operate on the data from one or both protocols. The logical operators might include any logical functions performed within the communication bridge itself. Outputs can be made to devices, to networks, or to local outputs, such as actuators or indicators. The ability to pass through data bridging to protocols and to operate logically upon the data where desired greatly facilitates the bridging functions of the circuitry, while permitting a functionality heretofore unattainable in either a bridging device or a control or monitoring device alone.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
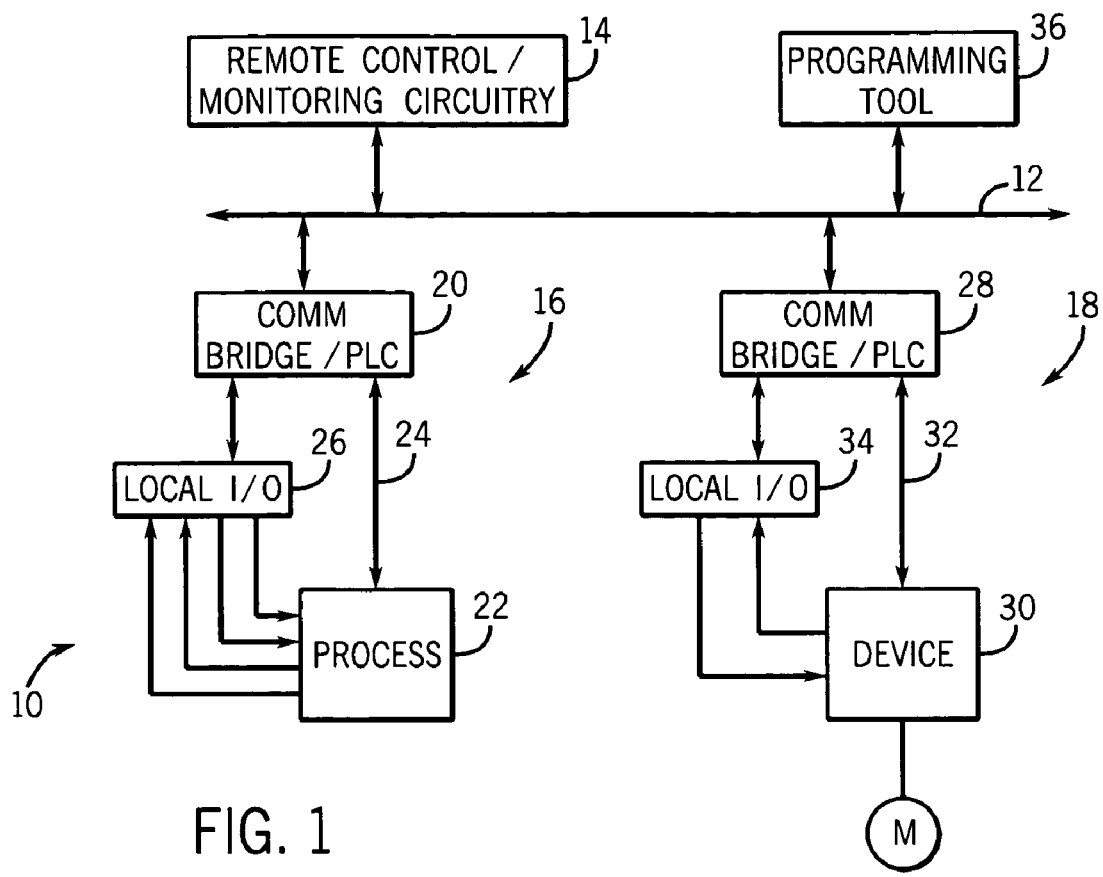
FIG. 1 is a diagrammatical representation of a portion of a network wherein circuitry and devices communicate in two different protocols by means of a communication bridge in accordance with aspects of the present technique.

Turning now to the drawings, and referring first to FIG. 1, a control and monitoring system is illustrated diagrammatically and represented generally by reference numeral 10. System 10 may be found in any industrial, commercial, or other environment and is adapted for providing communication between network devices over a network 12. In an industrial context, for example, the network 12 may include a series of data conductors, as well as power conductors for providing power to network devices. Alternatively, the data may be provided over separate data conductors, or may be superimposed over power in certain systems. In general, some type of remote control/monitoring circuitry 14 may be included for regulating operations of various loads, processes, and machinery, circuitry, and so forth. Circuitry 14, in an industrial context, may be included in a central control room or station, or at multiple locations within a plant. In the illustrated embodiment, system 10 further includes a pair of sub-networks 16 and 18.

Sub-network 16 is so termed because it provides and environment somewhat separate from the network 12, but linked to the network 12 via a communication protocol bridge 20. The communication protocol bridge 20 is linked to a process 22, which may in practice include many different components, machinery, actuators, sensors, and so forth. A network 24 is illustrated as liking the communication protocol bridge 20 and the process 22.

In general, the communication protocol bridge 20 permits data to be exchanged in different protocols between the network 12 and the network 24. Thus, in the embodiment illustrated in FIG. 1, on the side of the communication protocol bridge 20 linked to network 12, a first protocol will be employed for data communications, while on an opposite side of the communication protocol bridge 20, that of network 24, a different protocol may be employed. The protocol bridge permits the interlinking of devices and processes, then, utilizing one protocol with networks and other processes and devices utilizing a different protocol. By way of example only, protocols for which such bridging may be provided include protocols known as DSI (drive serial interface), DeviceNet (DNet), Scanport, Ethernet, Profibus, Modbus, and various proprietary protocols. In many applications, for example, devices and components of the process are specifically adapted for communicating in accordance with one protocol, while the network 12 is adapted for communication in accordance with a different protocol. In many applications, the protocol utilized on network 12 will be an open industrial network protocol, such as DNet.

As discussed in greater detail below, data required for decision making, control, actuation, and other operations performed in process 22 are provided from the network 12 through the communication protocol bridge 20. The communication protocol bridge may also communicate directly with local input and output components as indicated at reference numeral 26. The local I/O 26 may also provide data to and receive data from the components of process 22. As also discussed in greater detail below, in addition to passing data between the protocols in its "bridging" functions, the communication protocol bridge 20 serves to perform certain programmable logic operations on all or a portion of the data. Thus, the bridging circuitry is programmable so as to produce outputs which are not solely based upon the received data, but may be processed by the logical operations programmed into the communication protocol bridge.

FIG. 1 also illustrates a communication protocol bridge 28 as part of sub-network 18. The communication protocol bridge 28, which functions generally in a manner similar to that of communication protocol bridge 20, is here integrated into a device as indicated generally at reference numeral 30. The communication protocol bridge 28 serves to exchange data produced within an internal network 32 of the device 30 and the network 12. Here again, local I/O 34 may be provided as part of the device. Many such devices may be envisaged for performing various functions. For example, a sub-network 18 may form a component such as a distributed motor controller, across-the-line starter, distributed reversing starter, distributed soft starter, distributed inverter drive-based starter, a vector drive-based starter, or any other suitable device. The communication protocol bridge in such applications permits the communications within the device, then, to be exchanged in the one protocol virtually independent of the network 12. Data needed for operation of the device, or data to be supplied to other devices or, for example, to a sub-network 16 or remote control/monitoring circuitry 14 may be provided in the protocol network 12 by virtue of the operation of the communication protocol bridge 28. As with the communication protocol bridge 20, bridge 28 includes programmable logic circuitry that permits operations to be performed on the received and transmitted data.

In a presently contemplated embodiment, the communication protocol bridges 20 and 28 of the present technique include embedded micro-programmable logic controllers (micro-PLC's) that can operate both on the local discrete I/O data, as well as data received from one or both sides of the communication protocol bridge. In general, then, the communication protocol bridge serves functions of translating data between the network protocols, and also performing the programmed logic operations on any desired data, which may be referred to as "bound". This operation of the communication protocol bridge will be described in greater detail below.

Figure 2:
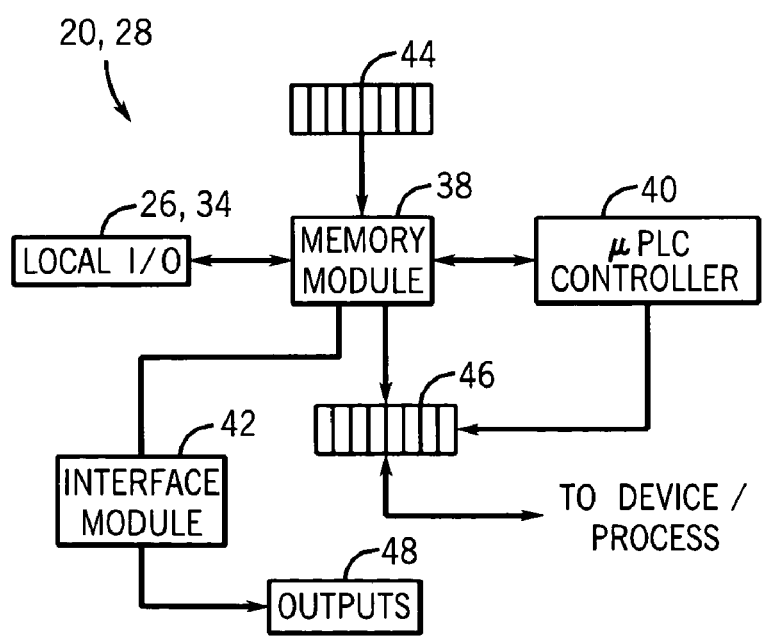
FIG. 2 illustrates certain functional circuitry of the communication bridge of the type illustrated in FIG. 1.

Referring to FIG. 2, logical and functional components of the communication protocol bridges 20 and 28 are illustrated. At a functional level, the communication protocol bridges include a memory module 38 which stores certain data received and transmitted in either of the interfaced protocols. A logic module 40 is provided which may execute any one of a range of programmable operations. The operations may be programmed, for example, locally at the communication protocol bridge or via a programming tool 36 (see FIG. 1) as illustrated in connection with the network 12 discussed above. An interface module 42 may be provided for producing local outputs. In general, the memory module 38 may receive data from either the network 12 discussed above or from a sub-network. The received data, indicated generally at reference numeral 44 in FIG. 2, may be analyzed and certain portions of the data stored within the memory module as discussed below. The memory module may also receive data from the local I/O 26, 34 which may populate certain portions of the memory. Finally, the memory module 38 may receive data from the logic module 40 following certain logical operations performed on data from the memory module. Both the memory module 38 and the logic module 40 may produce output data as indicated at reference numeral 46. The output data 46 may be supplied to either of the networks to which the communication protocol bridge is linked and in either one of the network protocols interfaced. Finally, outputs 48 are illustrated, which may be local outputs such as control outputs (e.g. relay or switch controls), lights and alarms, such as LED illumination indicators, and so forth.

Figure 3:
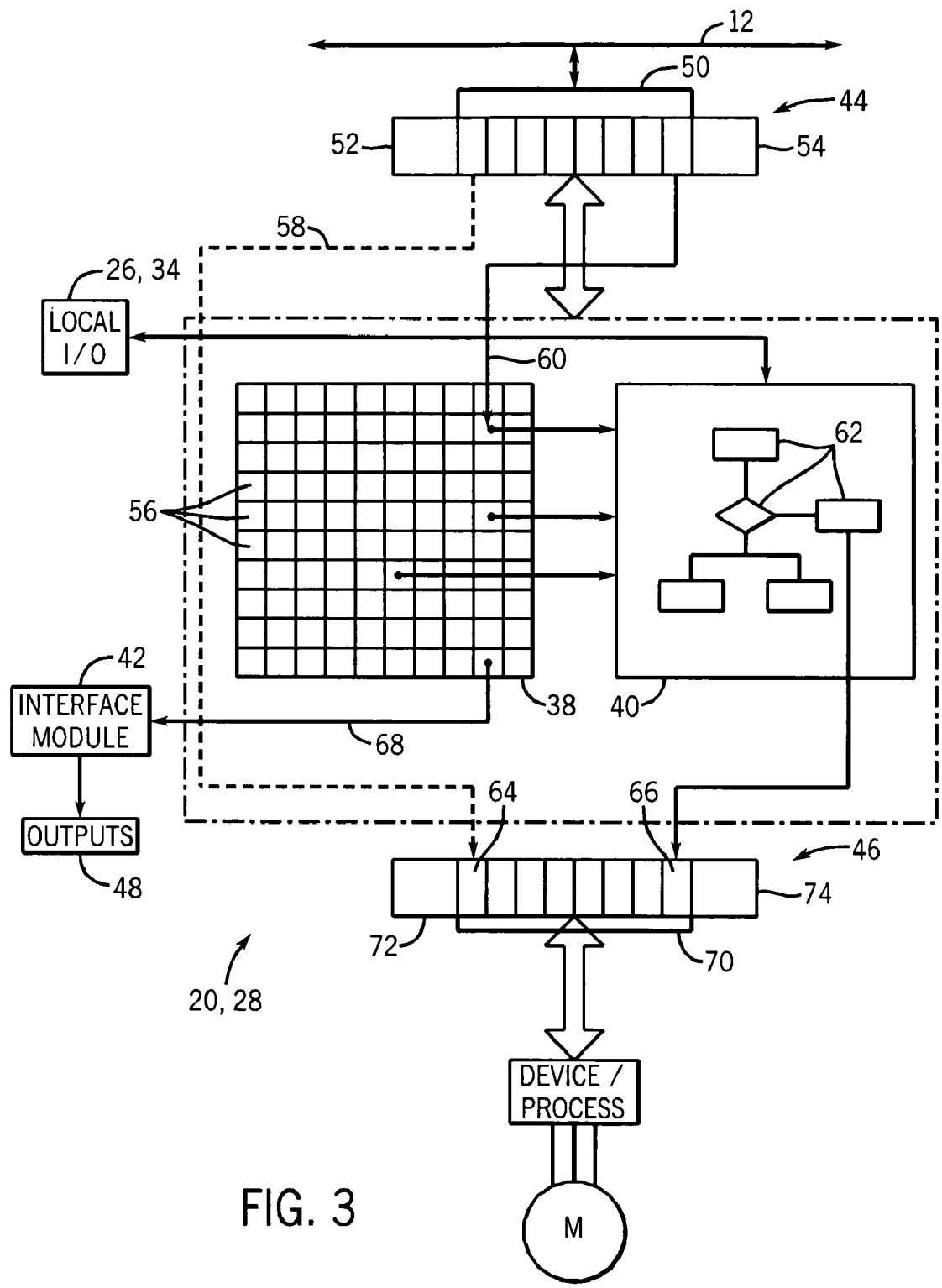
FIG. 3 represents, in somewhat greater detail, the functional components of the communication bridge illustrated in FIG. 2, and illustrating in somewhat greater detail exemplary operations that may be performed by the circuitry.

FIG. 3 illustrates certain of the components of the communication protocol bridges 20, 28 discussed above, in some greater detail. As noted above, each of the bridges is designed to be connected to a network 12 and to receive input data 44 from the network. It should be noted, however, that the received data 44 may be, more generally, from either of the networks or devices to which the bridge is connected. That is, the orientation and data flow illustrated in FIG. 3 may be reversed, such that the received data 44 is received from the device or process and output to the network 12. The data exchange provided between the protocols by the bridge is completely by-directional. Moreover, the logical operation performed on the data may be performed independently of whether the data is received from one network or the other, or from local I/O. The received data 44 may be analyzed as including implicit message data 50, with a transport layer attached thereto, such as in the form of a header 52 and trailer 54 in the illustrated embodiment. The communication protocol bridge functions to extract or strip the transport layer from the implicit data 50, and to analyze the bits of the implicit data in accordance with the known protocols. The data may then be stored in memory blocks 56 of the memory module 38.

In practice, the particular meaning of the implicit data may be established in accordance with the individual protocol. Similarly, the memory blocks 56 within the memory module may also be established by the protocols, so as to define a bit table or shared memory. In the illustrated embodiment, the implicit message may have a fixed link, such as 8 bits, although more or fewer bits, and additional bytes may be provided. Specific portions of the data will thus be identified and can be used to populate the bit table memory blocks 56. In an industrial control context, for example, the data may represent commands, such as "run forward" for a motor drive. The bit may be associated in any desired fashion to populate the bit table. In a presently contemplated embodiment, for example, bits of the table may be designated as inputs from a first network, inputs from a second network, outputs to the first network, outputs to the second network, logic function block values (operations), local hardware input and output designations, network status from either network (e.g., up, down, idle, run, etc.), and so forth. In the present embodiment, the entries in the bit table are either 1's or 0's, although specific digital values may also be envisaged.

The data stored within the memory module 38 may be either unbound or bound. Unbound data, indicated generally at reference numeral 58 in FIG. 3, is data that may be simply passed through the communication protocol bridge, or may be stored within the memory module 38, but not operated upon logically. Bound data, as indicated generally at reference numeral 60, is recognized as data on which logical operations are to be performed. The logical operations may be any suitable logical or mathematical relationships established between and among any of the data stored within the memory module 38, as well as data received from local I/O 26, 34, or from any other source. By way of example, where bound data 60 represents a "run forward" command, logical operations, such as an "on delay" may be performed on the bound data by the logic module 40. Logical operations, indicated generally at reference numeral 62, are therefore performed on the bound data pursuant to any programming provided within the logic module 40 (e.g., the micro-PLC). A wide range of such logical functions, including mathematical and Boolean operators, may be provided in the logic module 40.

Based upon operation of the bridge, and upon the logical operations performed by the logic module 40, output data 46 is produced and transmitted to the device or process to which the communication protocol bridge is coupled. Again, it should be noted that the output data may be provided in an opposite sense to the network 12 based upon the data received from the device or process. As illustrated in FIG. 3, then, the output data includes implicit data 70 to which a transport layer is appended, such as a header 72 and trailer 74. The implicit data may include pass-through data 64 which is essentially unchanged from its form as received. Other data, however, such as logical output data 66 may be included in the implicit output data and is based upon the logical operations performed by the logic module 40. Other output data may include local output data 68 which may be applied to an interface module 42 for producing local outputs 48. As noted above, such local outputs may include commands, such as for actuators, indicators, such as LED illumination signals, alarms, and so forth. Such outputs may be based upon different entries in the bit table, or the same entries that are used for logical operations performed by the logic module 40.

Figure 4:
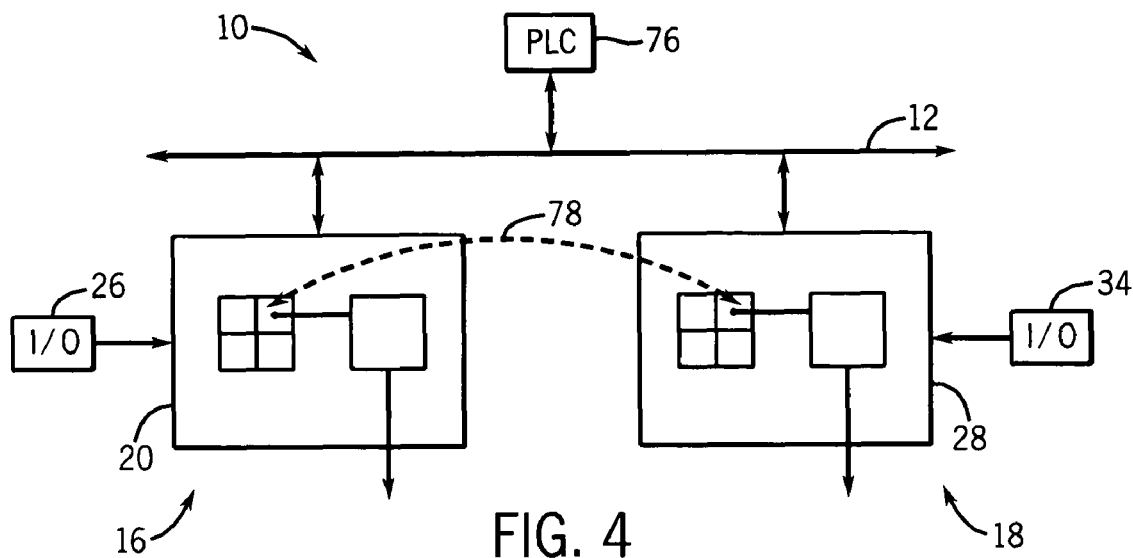
FIG. 4 is a diagrammatical representation of a pier-to-pier implementation of communication bridges in accordance with aspects of the present technique.

It should be noted that the foregoing arrangement may also be used simply to populate or broadcast data from one device to another. FIG. 4 illustrates such an implementation. In FIG. 4, a programmable logic controller (PLC) 76 is illustrated as coupled to network 12. Sub-networks 16 and 18 are provided with bridges 20 and 28 as described above. In this pier-to-pier arrangement, however, the bridges serve the additional function of simply broadcasting data from their respective process or device to the other process or device via its associated bridge. Thus, similar entries in the respective bit tables may be populated by broadcasting over the network 12. The data may then be used in a manner similar to that set forth above, that is, for local I/O, for communication or controlling a device or process, or simply for passing the data through to the device or process in accordance with a different protocol.

Figure 5:
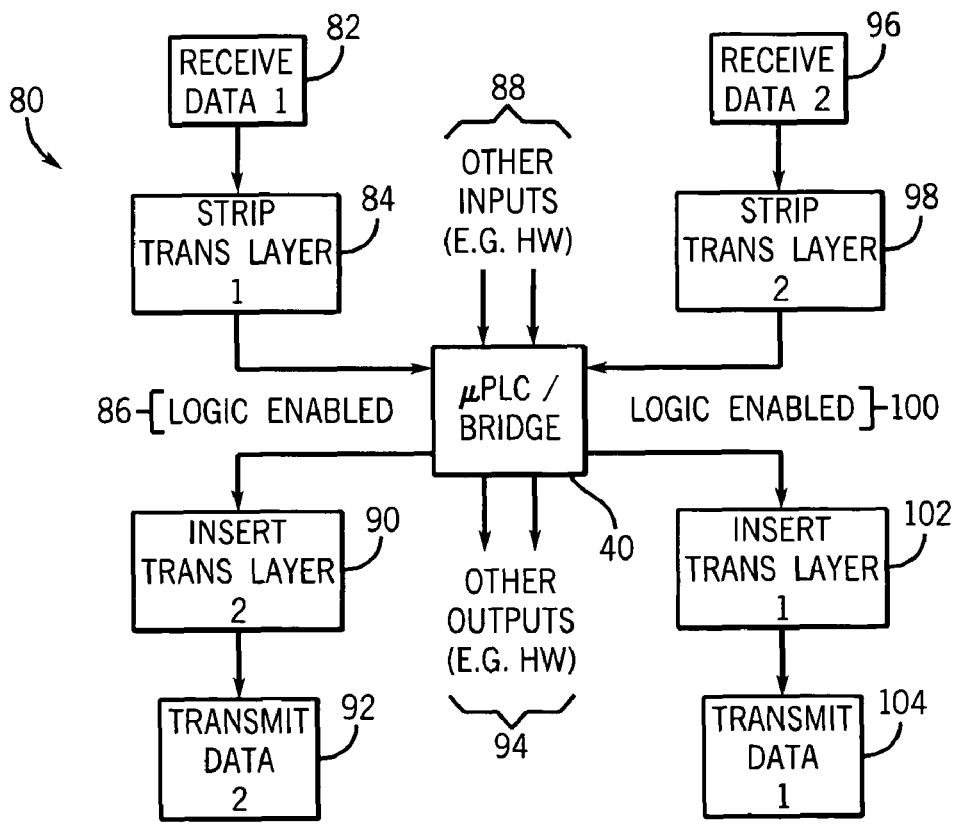
FIG. 5 is a flow chart illustrating operations performed on data passed through or operated upon by the communication bridge described herein.
Figure 6:
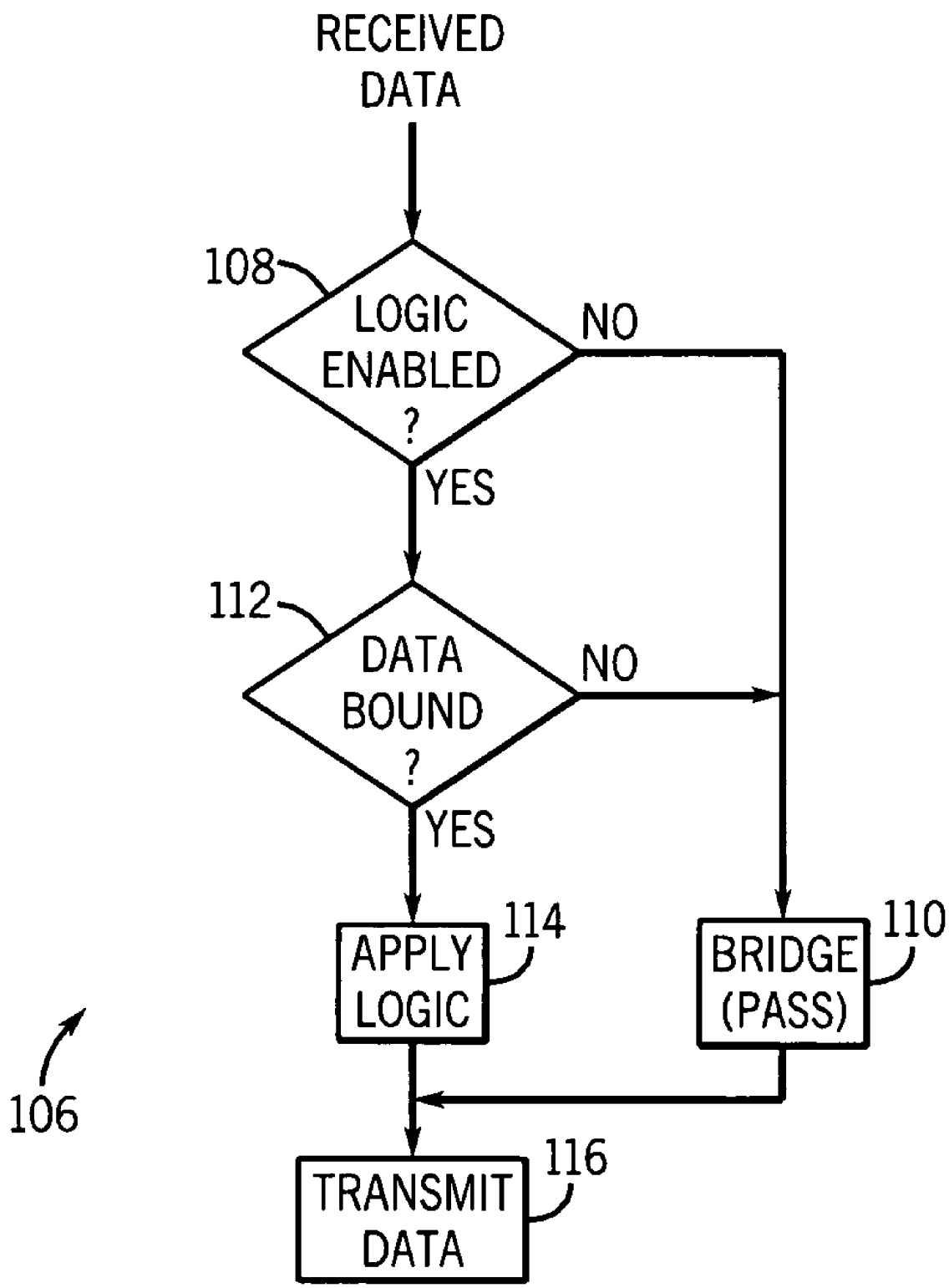
FIG. 6 is a flow chart illustrating an exemplary manner in which logical operations are performed on data received by the communication bridge described herein.

FIGS. 5 and 6 illustrate exemplary logic for receiving data and performing bridging operations and logical operations through the components and circuitry discussed above. As illustrated in FIG. 5, the bridge, indicated generally by reference numeral 80, may provide for performing operations on logic received from a first network, as indicated on the left in FIG. 5 or from a second network as indicated on the right of FIG. 5. Thus, as illustrated at step 82, data may be received by the bridge from a first network or device in a first protocol, and a transport layer of the first protocol stripped from the implicit data at step 84. The data may then be applied to the logic circuitry of the bridge, and where logic in the bridge is enabled, as indicated at reference numeral 86, certain logical operations may be performed on bound data. As noted above, other inputs may be provided, such as local I/O, hardware inputs, and so forth as indicated at reference numeral 88 in FIG. 5. If the logic is not enabled, or if the data is not bound, the data is simply passed through the device in a manner similar to a traditional bridging device. However, if the logic is enabled, and the data is bound, certain logical operations will be performed. Following such operations, output data is produced in accordance with the other protocol serviced by the device. That is, as indicated at reference numeral 90, a transport layer in accordance with the second protocol is inserted, and at step 92 the resulting data is transmitted in the second protocol. Other outputs 94 may also be provided as indicated above, such as to local I/O.

The bridge also serves to perform exactly analogous functions on data received in a second protocol, such as from a device or process. Thus, as illustrated at reference numeral 96 in FIG. 5, data may be received in a second protocol, and its transport layer in the second protocol stripped as indicated at reference numeral 98. If logic is enabled, as indicated at reference numeral 100 in FIG. 5, and certain data is bound in the received data, logical operations will be performed by the bridge. Following such logical operations, and based upon other inputs, if any, or if the logic is not enabled or the data is not bound, output data is generated by the bridge. As indicated at step 102, then, the transport layer required by the first protocol is inserted and the data may be then transmitted in the first protocol as indicated at step 104.

FIG. 6 illustrates exemplary logic designated generally by reference numeral 106 for performing the analysis and logical operations on received data as discussed above with reference to FIG. 5. In general, the bridge receives data and determines whether the programmed logic is enabled at step 108. If the logic is not enabled, the data, although, where appropriate, stored within the memory module, is simply passed through or bridged through the device as indicated at step 110. If the logic is enabled, the circuitry determines whether the data is bound at step 112. If the data is not bound, it is again simply passed through the device in a bridging operation. If the data is bound, on the other hand, the programmed logic is applied to the data as indicated at step 114. The result of the logical operations, in combination with data passed through or bridged through the device, is then used to generate the output data which may be transmitted as indicated at step 116. As summarized above with reference to FIG. 5, the data transmission steps within block 116 were typically include insertion of the appropriate transport layer, followed by transmission of the data in accordance with the desired output network protocol.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A data processing network protocol bridging system comprising:

a bridging device configured to receive data in two different protocols, to extract message data from the received data, and to compile output data in both protocols;

a memory circuit configured to store data extracted by the bridging device, wherein memory blocks of the memory circuit define a bit table having entries populated with implicit message data received in the first protocol and implicit message data received in the second protocol, wherein the implicit message data is representative of commands and/or values of operational parameters of an industrial process; and a programmable logic circuit configured to execute logical operations on designated data stored in the memory circuit to produce processed data to be included in the output data along with extracted message data on which logical operations are not executed.

2. The bridging system of claim 1, wherein the memory blocks of the memory circuit define the bit table based at least in part on the first protocol or the second protocol, or a combination thereof.

3. The bridging system of claim 1, wherein specific implicit message data populate specific entries of the bit table.

4. The bridging system of claim 1, wherein specific entries of the bit table are designated as inputs from a first network, inputs from a second network, outputs to the first network, outputs to the second network, local hardware input designations, local hardware output designations, network status from the first network, or network status from the second network, or any combination thereof.

5. The bridging system of claim 1, wherein at least one of the entries of the bit table consists of a single bit.

6. The bridging system of claim 1, wherein each of the entries of the bit table contains a digital value larger than a single bit.

7. A data processing network protocol bridging system comprising:

a bridging device configured to receive data in a first of two different protocols, to extract first implicit message data from the data received in the first protocol by removal of a first protocol transport layer, and to compile output data in a second of the two different protocols by insertion of a second protocol transport layer, the output data including unprocessed first implicit message data and processed data;

a memory circuit configured to store certain of the first implicit message data and certain second implicit message data of the second protocol representative of commands and/or values of operational parameters of one or more industrial processes in associated entries of a bit table of the memory circuit; and a programmable logic circuit configured to execute logical operations on designated implicit message data stored in the memory circuit to produce the processed data.

8. The bridging system of claim 7, wherein the bit table is defined based at least in part on the first protocol or the second protocol, or a combination thereof.

9. The bridging system of claim 7, wherein certain entries of the bit table are associated with categories of implicit message data, wherein the categories comprise inputs from a first network, inputs from a second network, outputs to the first network, outputs to the second network, local hardware input designations, local hardware output designations, network status from the first network, or network status from the second network, or any combination thereof.

10. The bridging system of claim 7, wherein at least one of the entries of the bit table is designated to store implicit message data representing a "run forward" command for a motor drive.

11. The bridging system of claim 7, wherein the bridging system is configured to pass the unprocessed implicit message data to an interface module of a local output device substantially unchanged via the bit table of the memory circuit.

12. A method for processing and bridging network data comprising:

receiving network data in a first protocol and a second protocol;

extracting first implicit message data from the received data of the first protocol and second implicit message data from the received data of the second protocol;

identifying first data and second data of the first implicit message data, wherein at least the second data of the first implicit message data is representative of commands and/or values of operational parameters of one or more industrial processes;

passing the first data of the first implicit message data substantially unchanged;

storing the second data of the first implicit message data in one or more entries of a bit table of a memory circuit associated with the second data of the first implicit message data, wherein the bit table of the memory circuit comprises one or more other entries comprising at least a portion of the second implicit message data from the received data of the second protocol;

processing designated implicit message data stored in the memory circuit to produce processed second data; and compiling output data in the second protocol including the substantially unchanged first data and the processed second data.

13. The method of claim 12, wherein the first data and the second data of the first implicit message data are identified as having a particular meaning established in accordance with the first protocol or the second protocol.

14. The method of claim 12, wherein the second data of the first implicit message data is stored in the one or more entries of the bit table of the memory circuit that are associated with a particular meaning identified as associated with the second data of the first implicit message data.

15. The method of claim 12, wherein the second data of the first implicit message data is stored in the one or more entries of the bit table, wherein at least one of the one or more entries of the bit table consists of a single bit.

16. The method of claim 12, wherein the second data of the first implicit message data is stored in one of the one or more entries of the bit table of the memory circuit that is designated to store implicit message data representing industrial control commands.

17. The method of claim 12, comprising receiving local input signals and storing the local input signals in one or more entries of the bit table of the memory circuit designated as local hardware inputs.

18. The method of claim 12, comprising generating local output signals by transmitting the second data of the implicit message data from the one or more entries of the bit table of the memory circuit to an interface module of a local output device.

19. The method of claim 12, wherein the second data of the first implicit message data is stored in the one or more entries of the bit table of the memory circuit based on whether the second data is identified as deriving from a first network, deriving from a second network, designated to be provided to the first network, designated to be provided to the second network, deriving from a local hardware input, designated to be provided to a local hardware output, representing network status from the first network, or representing network status from the second network, or any combination thereof.

20. A method for processing and bridging network data comprising:
receiving network data in a first protocol and a second protocol;
extracting first implicit message data from the received data of the first protocol and second implicit message data from the received data of the second protocol;
determining whether any portion of the first implicit message data is bound, wherein the bound portion of the first implicit message data is representative of one or more commands and/or values of operational parameters of one or more industrial processes;
if any portion of the first implicit message data is bound, storing the bound portion of the first implicit message data in a bit table of a memory circuit, wherein the bit table of the memory circuit comprises one or more other entries comprising at least a portion of the second implicit message data from the received data of the second protocol, before processing designated implicit message data stored in the memory circuit to to generate a portion of output data;
if any portion of the message data is not bound, bridging that portion of the implicit message data substantially unchanged to generate a second portion of the output data; and
compiling the output data in the second protocol.

21. The method of claim 20, comprising determining whether logical operations are enabled and if logical operations are not enabled, bridging all implicit message data substantially unchanged if logical operations are not enabled.

22. The method of claim 20, wherein the processing operations performed on the bound portion of the first implicit message data are selected based on a location within the bit table in which the bound portion of the first implicit message data is stored.

23. The method of claim 22, wherein certain locations within the bit table are designated for certain processing operations.

24. The method of claim 20, comprising identifying a particular meaning of the bound portion of the first implicit message data established in accordance with the first protocol or the second protocol.

25. The method of claim 24, wherein the first implicit message data data is stored in one or more locations of the bit table of the memory circuit based on the particular meaning.

26. The method of claim 20, comprising receiving local input signals and storing the local input signals in one or more locations of the bit table of the memory circuit designated as local hardware inputs.

27. The method of claim 20, comprising generating local output signals by transmitting the bound portion of the first implicit message data from the bit table to an interface module of a local output device.

28. The method of claim 20, wherein the bound portion of the first implicit message data is stored in one or more locations of the bit table of the memory circuit based on whether the bound portion of the implicit message data derives from a first network, derives from a second network, is designated to be provided to the first network, is designated to be provided to the second network, derives from a local hardware input, is designated to be provided to a local hardware output, represents network status from the first network, or represents network status from the second network, or any combination thereof.

29. The method of claim 20, wherein the bound portion of the first implicit message data is stored in a location of the bit table of the memory circuit that is designated to store implicit message data representing an industrial control command.

30. The method of claim 29, wherein the industrial control command is a "run forward" command for a motor drive.

31. A system for processing and bridging network data comprising:
means for receiving network data in a first protocol and a second protocol;
means for extracting first implicit message data from the received data of the first protocol and second implicit message data from the received data of the second protocol;
means for storing first data or second data of the first implicit message data based on a particular meaning associated with the first data or the second data, wherein the particular meaning associated with the first data or the second data is representative of one or more commands and/or values of operational parameters of one or more industrial processes, and wherein the means for storing first data or second data of the first implicit message data comprise means for storing at least a portion of the second implicit message data;
means for passing the first data substantially unchanged;
means for processing the second data; and
means for compiling output data in the second protocol including the substantially unchanged first data and the processed second data.

32. A system for processing and bridging network data comprising:
means for receiving network data in a first protocol and a second protocol;
means for extracting first implicit message data from the received data of the first protocol and second implicit message data from the second protocol;
means for determining whether any portion of the first implicit message data is bound, wherein the bound portion of the first implicit message data is representative of one or more commands and/or values of operational parameters of one or more industrial processes;
means for, if any portion of the first implicit message data is bound, storing the bound portion of the first implicit message data and at least a portion of the second implicit message data and processing the bound portion of the implicit message data to generate a portion of output data;
means for, if any portion of the first implicit message data is not bound, bridging that portion of the first implicit message data substantially unchanged to generate a second portion of the output data; and
means for compiling the output data in the second protocol.

* * * * *